July 8, 1941.   H. T. BUDENBOM   2,248,215

RADIO DIRECTION AND DISTANCE INDICATING SYSTEM

Filed June 20, 1940   4 Sheets-Sheet 1

INVENTOR
H. T. BUDENBOM
BY
H. O. Wright
ATTORNEY

July 8, 1941.  H. T. BUDENBOM  2,248,215

RADIO DIRECTION AND DISTANCE INDICATING SYSTEM

Filed June 20, 1940   4 Sheets-Sheet 3

INVENTOR
H. T. BUDENBOM
BY
*H. Wright*
ATTORNEY

July 8, 1941.　　　H. T. BUDENBOM.　　　2,248,215
RADIO DIRECTION AND DISTANCE INDICATING SYSTEM
Filed June 20, 1940　　　4 Sheets-Sheet 4

FIG. 6

INVENTOR
H. T. BUDENBOM
BY H. O. Wright
ATTORNEY.

Patented July 8, 1941

2,248,215

UNITED STATES PATENT OFFICE 2,248,215

RADIO DIRECTION AND DISTANCE
INDICATING SYSTEM

Horace T. Budenbom, Short Hills, N. J., assignor to Bell Telephone Laboratories, Incorporated, New York, N. Y., a corporation of New York Application June 20, 1940, Serial No. 341,517

8 Claims. (Cl. 250—1)

This invention relates to radio direction, distance position and course indicating systems and methods.

More specifically, it relates to systems and methods for obtaining directional indications from modulating frequencies to which directional characteristics have been imparted either by directional reception or directional transmission; systems and methods for obtaining distance indications by phase comparison of several components of a radio wave or by a beat-note obtained by the combination of several components of frequency-modulated waves; and systems and methods combining directional and distance indications with altimeter indications to provide indications of position and course in space.

Applicant's copending application Serial No. 389,135 filed April 18, 1941, entitled "Radio distance and altitude indicating systems" is a division of this application.

It has long been known that during the transmission of electromagnetic waves from an antenna the field established evinces, within about the first wave-length from the source, two aspects of different relative time-phase, with the result that the relative composite time-phase of the wave varies with the distance from the radiator within the first wave-length of the energy being radiated. These two aspects have, by some investigators, been designated as the "radiation" and the "induction" fields, respectively. These are discussed for instance in the well-known text, entitled "Principles of Radio Communication" by J. H. Morecroft, second edition, published by John Wiley & Sons, Inc., of New York city, in 1927, chapter IX, particularly on page 818. The basis of one feature of this invention appears capable of most concise discussion in terms of the "electric" and "magnetic" fields in the region of the first wave-length. A mathematical analysis of the relations as used in this invention, to be expounded hereinafter, is based upon the standard text entitled "The Classical Theory of Electricity and Magnetism" by Max Abraham (revised by Richard Becker and translated by John Dougall) published by Blackie & Son, Limited, London and Glasgow, 1932.

This invention teaches that the phenomena above described may be employed to obtain useful distance indications by transmitting from a known point an electromagnetic wave of wavelength somewhat greater than the maximum distance to be indicated, separately receiving, at a second point, the necessary components of said wave, determining the time-phase relation between the components received, and using this time-phase relation to obtain an indication of the distance of the second point from the first. Investigation of the phenomenon has disclosed that the phase difference is of sufficient magnitude to provide useful indications at distances from the reference point up to nearly a wavelength of the radiated wave. This invention further teaches that the entire "electric" component may be received by an open antenna and that the "magnetic" component may be received by an electrostatically shielded loop antenna.

By modulating the above-mentioned electromagnetic wave with two or more low frequencies to which directionally significant relative phase and amplitude characteristics have been imparted, as is suggested, for example, in my copending application entitled "Radio direction finding systems," Serial No. 231,333, filed September 23, 1938, in connection with the system illustrated by Fig. 7 of the drawings of said application and in connection with Figs. 3 and 6 of this application, it is possible to simultaneously obtain an indication of the direction of the second point from the first. An alternative method of providing a simultaneous directional indication to a mobile craft, which employs the directive transmission of several components of a wave modulated by different low frequencies, is described in U. S. Patent 1,922,677 issued August 15, 1933, to J. W. Greig et al. and its use is also suggested in connection with the systems of Figs. 4 and 7 hereinunder. If, further, an indication of altitude is obtained by any of the numerous methods well known to the art, such, for example, as that described in U. S. Patent 2,045,071 issued June 23, 1936, to L. Espenschied, the precise location of an aircraft relative to a fixed point on the surface of the earth and its course with respect thereto can be obtained.

Employed in combination, the indications of distance, direction and altitude are, obviously, sufficient to enable a pilot to guide his craft so as to approach, or to leave, a landing field along any desired path in space. Such a system might be called a cylindrical coordinate system.

In so far as the general principles underlying the first of the above-mentioned directional indicating systems are concerned, this application is a continuation in part of my above-mentioned copending application Serial No. 231,333, filed September 23, 1938.

An alternative method of distance determination, which can be employed to extend the range of systems of the invention, comprises radiating from the craft a frequency modulated wave, receiving the wave at a fixed reference point and retransmitting it to the craft where it is combined with the wave being instantly radiated to provide a beat-note, the frequency of which is a function of the distance. This arrangement represents an extension of the principles of the altimeter systems of Patents 2,045,071 and 2,045,072, both issued June 23, 1936, to L. Espenschied. The same frequency-modulated wave can be employed to obtain altitude indications simultaneously. Appropriate means for segregating the two significant beat-notes are, of course, provided. A further alternative method which can be employed comprises a similar arrangement but the radiated wave is not frequency-modulated and distance indications are obtained by phase comparison of modulation components of the original and retransmitted waves.

Accordingly, objects of the invention are to provide novel systems and methods for obtaining direction and distance indications and to provide combinations of apparatus for practicing the novel methods to simultaneously provide direction, distance, altitude, position and course indications.

A further object of the invention is to provide in combination, simultaneous, instantaneous and continuous direction, distance and altitude indications which will enable an aircraft pilot to guide his craft so as to approach or depart from a fixed point on the earth along any desired path or course in space.

Another object is to provide systems and methods for determining distance requiring only a simple phase comparison of two components of a wave transmitted from a known point.

Another object is to provide a system and method for determining the distance from a moving craft to a remote beacon station by use of a frequency-modulated wave.

Other objects will become apparent during the course of the following description of illustrative embodiments of the features of the invention and from the appended claims.

The principles of the invention will be more readily understood from the following description and the accompanying drawings, in which.

Figure 1:
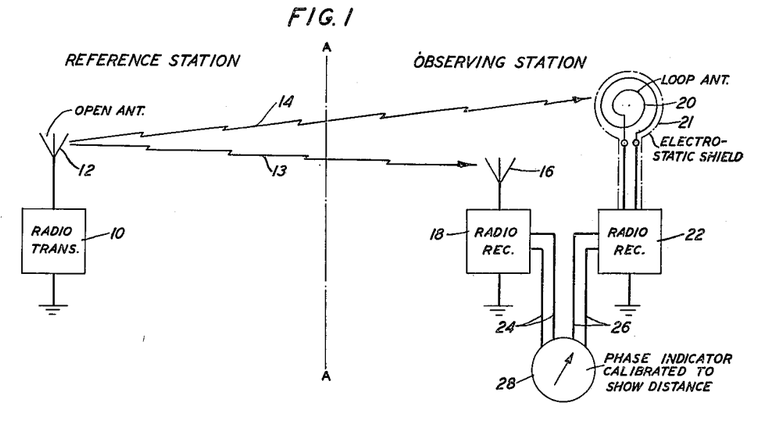
Fig. 1 illustrates, in diagrammatic form, a system of the invention for providing distance indications by phase comparison of two components of a transmitted wave.

In more detail in Fig. 1 the reference station to the left of line A—A comprises radio transmitter 10 which is adapted to emit from antenna 12 a radio wave having a wave-length somewhat greater than the greatest distance to be measured. By way of example, for distances out to 5 miles or 8 kilometers a wave of between 8,000 and 20,000 meters wave-length can be employed, a precise choice depending upon the precision of the phase measurements afforded in the receiving system as will become apparent in the following discussion. The reference or transmitting station is, normally, located at a known fixed point, although, obviously the same system can be employed to provide distance indications with respect to a mobile reference station. At the observing station to the right of line A—A, which is usually on a mobile object or craft, open antenna 16 and loop antenna 20 enclosed in electrostatic shield 21 are adapted independently to receive the wave emitted from antenna 12. The two received components are passed through radio receivers 18 and 22, associated with antennas 16 and 20, respectively, and the outputs of the receivers are introduced through leads 24 and 26, respectively, into phase indicator 28, where the relative time-phase relations between them are observed, to obtain indications of the distance of the observing station from the reference station. Indicator 28 may be a phase indicator of any of the numerous suitable types well known to the art, and can, conveniently, be calibrated, for each of several wave-lengths which the system can be adapted to employ, to read distance directly.

Figure 2:
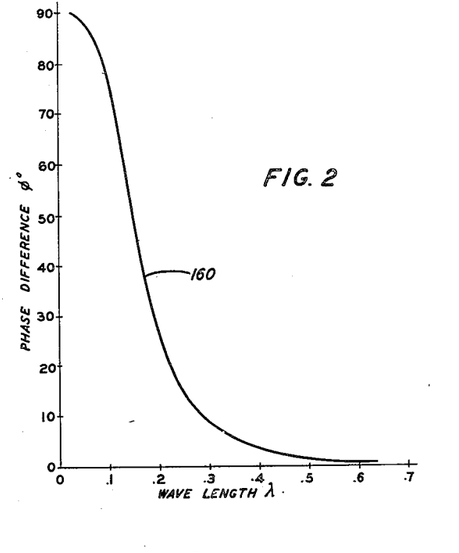
Fig. 2 illustrates the variation of the time-phase relation between the components employed as taught in connection with Fig. 1 of this invention to obtain distance indications.

The variation of the time-phase relation between the utilized components, above described, of an electromagnetic wave with distance is illustrated by curve 160 of Fig. 2. While phase changes beyond about 0.6 of a wave-length may approach the limit of accuracy of simple phase measuring apparatus, a nearly "in-phase" indication will at least serve to show that the reference station is 0.6 of a wave-length or more distant. Obviously the range of the system may be changed by merely changing the wave-length of the radiated wave and substituting a calibration of the phase indicator appropriate for the new wave-length. The indicator may, as above-mentioned, carry, on its face, a plurality of scales each appropriate for a particular different wave-length.

In Fig. 2, curve 160 represents the changes in time-phase $\Phi$, between the components of a radio wave which are to be utilized for obtaining distance indications, as above described, with distance from the point of origin of the wave. To derive this curve, reference may be made to pages 223 to 226 of the above-mentioned standard text "The Classical Theory of Electricity and Magnetism" by Max Abraham, which gives the expressions for the field components due to a small radiating vertical dipole excited by an electrical disturbance $f = f(t)$. Abraham applies the Lorenz solution of Maxwell's equations:

$$\left. \begin{array}{l} \underline{H} = \text{curl } \underline{A} \\ \underline{E} = -\dfrac{1}{c}\underline{\dot{A}} - \text{grad } \Phi \end{array} \right\} \quad (1)$$

According to the reference, $$A_r = \frac{1}{cr} f(t - r/c) \cos\theta, \quad A_\theta = -\frac{1}{cr} f(t - r/c) \sin\theta, \quad A_\alpha = 0$$

whence
$$H_r = 0, \text{ also } H_\theta = 0$$

Also we have
$$\Phi = \left\{\frac{1}{cr}\dot{f}(t-r/c) + \frac{1}{r^2}f(t-r/c)\right\}\cos\theta$$

so
$$\text{grad}_\alpha \Phi = \frac{1}{r\sin\theta}\frac{\delta\Phi}{\delta\alpha} = 0; \quad \left(\text{grad}_r \Phi = \frac{\delta\Phi}{\delta r}\right);$$

and
$$\text{grad}_\theta \Phi = \frac{1}{r}\frac{\delta\Phi}{\delta\theta} = -\frac{1}{r}\left(\frac{1}{cr}\dot{f} + \frac{1}{r^2}f\right)\sin\theta = -\left(\frac{\dot{f}}{cr^2} + \frac{f}{r^3}\right)\sin\theta$$

and at page 225, the magnetic field is given by:
$$H_\alpha = \frac{\sin\theta}{r}\left(\frac{\ddot{f}}{c^2} + \frac{\dot{f}}{cr}\right) \doteq H = \frac{1}{r}\left(\frac{\ddot{f}}{c^2} + \frac{\dot{f}}{cr}\right) = \frac{\ddot{f}}{c^2 r} + \frac{\dot{f}}{cr^2} \quad (2)$$

Also,
$$E_\theta = \frac{\ddot{f}}{c^2 r}\sin\theta + \left(\frac{\dot{f}}{cr^2} + \frac{f}{r^3}\right)\sin\theta \doteq E = \frac{\ddot{f}}{c^2 r} + \left(\frac{\dot{f}}{cr^2} + \frac{f}{r^3}\right) \quad (3)$$

The approximations indicated in Equations 2 and 3 above are valid here since in Abraham's spherical coordinate notation, $(r, \theta, \alpha)$, $\theta$ is measured from the vertical. As the elevation of the craft above the horizon will, in the present application, never be large, as viewed from the transmitter, $\theta$ will be less than 20 degrees smaller than a right angle, and $\sin\theta \doteq 1$.

Since only relative phase is of interest, we may consider the disturbance to be of such order that we may take the amplitude multiplier as unity; we also assume it to be of the time form $$f(t) = \cos\omega(t-r/c) = \cos\omega[t]$$

so
$$\dot{f} = -\omega\sin\omega[t] \text{ and } \ddot{f} = -\omega^2\cos\omega[t]$$

whence
$$E = -\left(\frac{\omega}{c}\right)^2 \frac{\cos\omega[t]}{r} - \left(\frac{\omega}{c}\right)\frac{\sin\omega[t]}{r^2} + \frac{\cos\omega[t]}{r^3} \quad (4)$$

$$H = -\left(\frac{\omega}{c}\right)^2 \frac{\cos\omega[t]}{r} - \left(\frac{\omega}{c}\right)\frac{\sin\omega[t]}{r^2}$$

Dropping the retardation, as common to both, multiplying by $-1$, and putting $$\frac{\omega}{c} = \frac{2\pi}{\lambda} = m$$

$$-E = \frac{m^2}{r}\cos\omega t + \frac{m}{r^2}\sin\omega t - \frac{1}{r^3}\cos\omega t$$

$$-H = \frac{m^2}{r}\cos\omega t + \frac{m}{r^2}\sin\omega t \quad (5)$$

We can now express these in the forms $\cos(\omega t - e)$ and $\cos(\omega t - h)$ respectively and for the present purposes only the values of the angles $e$ and $h$ are of interest.

$$e = \tan^{-1}\left(\frac{m}{r^2} \div \frac{m^2}{r} - \frac{1}{r^3}\right) = \tan^{-1}\left(\frac{m}{r^2} \div \frac{m^2 r^2 - 1}{r^3}\right)$$

$$= \tan^{-1}\left(\frac{m}{r^2} \cdot \frac{r^3}{m^2 r^2 - 1}\right) = \tan^{-1}\left(\frac{mr}{m^2 r^2 - 1}\right) \quad (6)$$

$$h = \tan^{-1}\left(\frac{m}{r^2} \div \frac{m^2}{r}\right) = \tan^{-1}\left(\frac{m}{r^2} \cdot \frac{r}{m^2}\right) = \tan^{-1}\left(\frac{1}{mr}\right)$$

the phase difference between the two branch signals, i. e., that of the open antenna and that of the shielded loop antenna, is then $$\Phi = (e-h) = \tan^{-1}\left(\frac{mr}{m^2 r^2 - 1}\right) - \tan^{-1}\left(\frac{1}{mr}\right)$$

$$= \tan^{-1}\frac{\frac{mr}{m^2 r^2 - 1} - \frac{1}{mr}}{1 + \frac{1}{m^2 r^2 - 1}} = \tan^{-1}\frac{\frac{m^2 r^2 - m^2 r^2 + 1}{mr(m^2 r^2 - 1)}}{\frac{m^2 r^2 - 1 + 1}{m^2 r^2 - 1}} \quad (7)$$

$$= \tan^{-1}\left(\frac{1}{mr(m^2 r^2 - 1)} \cdot \frac{(m^2 r^2 - 1)}{m^2 r^2}\right) = \tan^{-1}\frac{1}{(mr)^3}$$

From which is derived the following table of values of $\Phi$, remembering that $$m = \frac{2\pi}{\lambda}$$

| $r$ | $mr$ | $(mr)^3$ | $1/(mr)^3 = \tan\Phi$ | $\Phi$ degrees |
|---|---|---|---|---|
| $\lambda/8\pi$ | ¼ | 1/64 | 64 | 89.1 |
| $\lambda/4\pi$ | ½ | ⅛ | 8 | 82.9 |
| $\lambda/3\pi$ | ⅔ | 8/27 | 27/8 | 73.5 |
| $\lambda/2\pi$ | 1 | 1 | 1 | 45 |
| $3\lambda/4\pi$ | 3/2 | 27/8 | 8/27 | 16.5 |
| $\lambda/\pi$ | 2 | 8 | .125 | 7.1 |
| $2\lambda/\pi$ | 4 | 64 | 1/64 | .9 |

Using the values of $r$ in terms of $\lambda$ as abscissae and the phase shifts $\Phi$ in degrees as ordinates, the curve 160 plotted in Fig. 2 is obtained.

Figure 3:
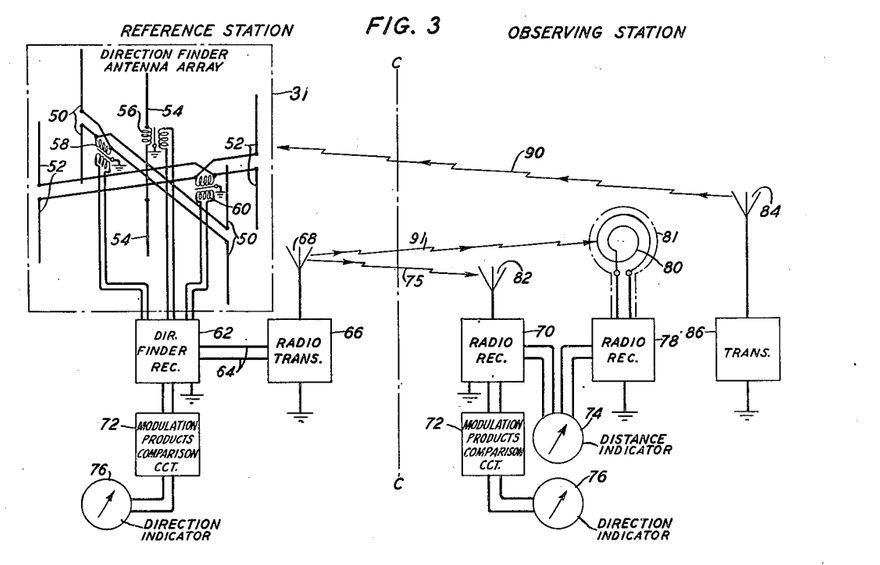
Fig. 3 illustrates, in diagrammatic form, a system of the invention providing simultaneous indications of direction and distance.

In Fig. 3 apparatus is added to a system of the type described in connection with Fig. 1 to provide directional indications simultaneously with distance indications at the observing station, as well as directional indications at the reference station.

The principles underlying the method of obtaining the directional indications are those described in my above-mentioned copending application, particularly in connection with Figs. 2 and 7 thereof. In accordance with the method, a radio wave 90 is radiated from the observing station by antenna 84 which is energized by transmitter 86. This wave is received at the reference station on a directional antenna system 31 which comprises two balanced Adcock antennas, each consisting of two dipole antennas having radiating members 50 and 52, respectively, the Adcock antennas being placed at right angles to each other about a common central axis on which is located a simple dipole antenna having radiating members 54. The horizontal leads of the Adcock antennas are precisely balanced electrically and shielded transformers 56, 58 and 60 are employed to make electrical connection.

It should be particularly noted that this antenna system is peculiarly well suited for use with directional systems whose function is to determine azimuth angles in a horizontal plane, since the central antenna comprising members 54, though having a non-directional characteristic in a horizontal plane, discriminates against vertical components of incoming waves in exactly the same manner as the members 50 and 52 of the balanced Adcock antennas, completing the system. This renders more perfect the defense of the antenna system against "night errors" and errors encountered using ordinary antenna systems when the incoming waves are approaching at a steep vertical angle.

Thus three components of the wave 90 are received by the antenna system 31 and furnished to direction finder receiver 62. The relative phases and amplitudes of the two components directionally received on the Adcock antennas will suffice as a basis for obtaining directional indications when the non-directionally received component obtained from the central dipole antenna is employed as a reference by the method described in connection with Fig. 2 of my above-mentioned copending application. According to this method each directionally received component is modulated in a balanced modulator by a different low frequency (commonly called a poling frequency). The ouputs of the two balanced modulators will then, as is well known in the art, comprise only the side-band frequencies. These are rotated 90 degrees in phase to bring them into the proper phase relation with the carrier frequency received on the non-directional antenna with which they are then combined and the combination is detected. By this process the two poling frequencies are modified to have the same relative phases and amplitudes with respect to each other as the original received components of the radio wave had with respect to each other.

In the modulation products comparison circuit 72, the two modified poling frequencies are separated by appropriate band filters and each is combined in conjugate relation with energy of like frequency but having the phase and amplitude of the unmodified poling frequency employed in the original modulating process. The circuit in which combination in conjugate relation is accomplished is known in the art as a common-frequency, conjugate-input, balanced demodulator. The output of each half of the demodulator is passed through a resistive load of equal magnitude and the differential voltage, or voltage between the respective anode leads, of the two load resistances, indicates by its polarity the phase of the modified poling frequency and by its magnitude the amplitude of the modified poling frequency. By placing the two differential voltages on two pairs of deflecting plates of a cathode ray indicator which are oriented in the same way as the Adcock antennas the ray of the tube will be deflected in the direction from which radio wave 90 impinges upon antenna system 31. From the above description it is apparent that direction indicator 76 is, in a preferred embodiment, a cathode ray indicator having two pairs of deflecting plates oriented in the same way as the Adcock antennas of the system. Apparatus for generating a base frequency and from it the unmodified poling frequencies is included in comparison circuit 72. This latter apparatus will be described in detail in connection with Fig. 4.

To complete the description of the system of Fig. 3, direction finder receiver 62, through leads 64, furnishes radio transmitter 66 with the modified poling frequencies obtained by modulating the directionally received components of wave 90, as well as a base frequency from which unmodified poling frequencies may be derived. Radio transmitter 66 energizes antenna 68 with a radio wave of wave-length suitable for the greatest distance to be measured as discussed above and modulates it by the above-mentioned modified poling frequencies and the base frequency.

At the observing station the field resulting from transmission from antenna 68 is received on loop antenna 80 enclosed in electrostatic shield 81 and on open antenna 82. In radio receiver 70, the poling frequencies and base frequency are detected and furnished to comparison circuit 72 which supplies direction indicator 76 with two differential voltages as in the case of the similar apparatus at the reference station. In this case, however, it will usually be desirable to orient the indicator so that the ray deflects in the direction of the reference station, instead of in the opposite direction (i. e. the direction in which wave 90 approached antenna system 31). Radio receivers 70 and 78, supplied by antennas 82 and 80, respectively, provide distance indicator 74 with suitable energy components from the carrier wave radiated from antenna 68 and, as in the system of Fig. 1, the time-phase relation between them provides an indication of distance.

Figure 4:
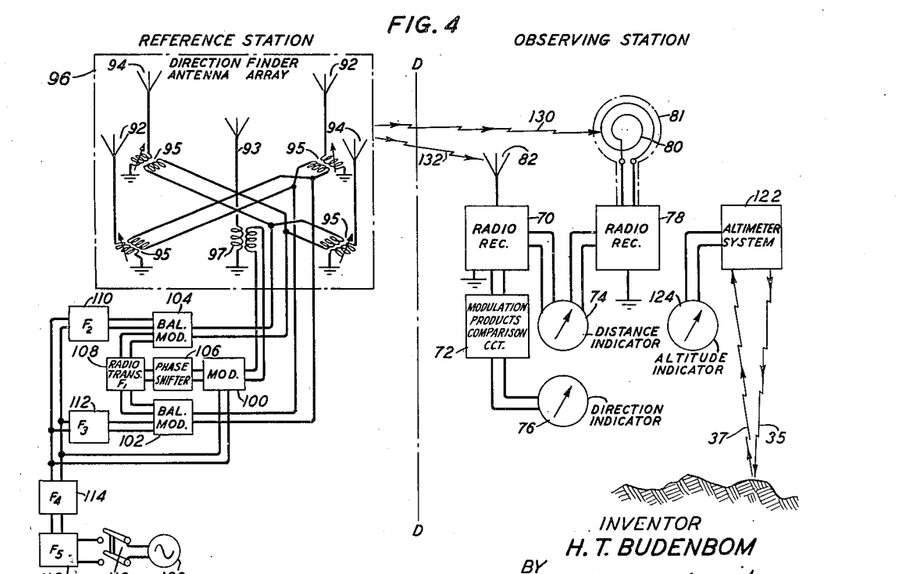
Fig. 4 illustrates, in diagrammatic form, an alternative system of the invention providing simultaneous indications of direction, distance and altitude.

Fig. 4 represents a further combination of apparatus which is similar to that of Fig. 3 except that an altimeter system has been added and the directional indication is obtained at the observing station from several waves originating at the reference station. The reference station of Fig. 4, including the antenna system 96, in essentially that shown in Fig. 1 of the drawings accompanying United States Patent 1,922,677, issued August 15, 1933, to J. W. Greig et al., except that both low modulating frequencies are obtained from a single source as taught in my above-mentioned copending application and that, as for the system of Fig. 3 described above, the non-directional carrier wave is modulated by a base frequency from which the two low modulating frequencies may be derived.

The reference station of Fig. 4 transmits the side-bands resulting from the modulation of the radio frequency by one low frequency from the directional antenna system including antennas 94 and the side-bands resulting from modulation of the radio frequency by the other low frequency from the directional antenna system including antennas 92. As an illustration of an acceptable scheme for the generation of the aforementioned low frequencies, source 120 may be a 60-cycle alternating current supply line, frequency changer 116 preferably produces the second harmonic (120 cycles) of the frequency of source 120, frequency changer 114 produces a subharmonic of the second harmonic (24 cycles) and frequency changers 110 and 112 produce different harmonics (96 cycles and 144 cycles, respectively) of the subharmonic produced by frequency changer 114 so that, as explained in my above-mentioned copending application, the two low frequencies (supplied to modulators 102 and 104, respectively) are not harmonically related with the frequency of the source 120 or with each other.

Carrier wave energy, generated in transmitter 108, is passed through phase shifter 106 (for reasons explained in the above-mentioned patent to Greig et al.,) is modulated in modulator 100 by the base frequency (24 cycles) furnished by frequency changer 114 and is radiated from non-directional antenna 93. Waves 130 and 132 represent the induction and radiation fields, respectively emitted from the reference station antenna system. At the observing station these fields are received on antennas 80 and 82, respectively, and as for the system of Fig. 3 their time-phase relation is determined to provide an indication of the distance from the observing station to the reference station. The side-bands transmitted from antennas 92 and 94 are combined with the carrier transmitted from antenna 93 and the combination is demodulated and the low frequencies, viz., 24 cycles, 96 cycles and 144 cycles are detected and furnished to comparison circuit 72 where the latter two frequencies are combined in conjugate relationship with frequencies of their respective frequency derived from the base frequency of 24 cycles, as explained in connection with Fig. 3 and in my above-mentioned copending application, and the combinations are applied conjointly to operate direction indicator 76 which, as previously stated, is preferably a cathode ray indicator.

Altimeter system 122, operating indicator 124, may be any one of numerous systems well known to the art. Preferably it should provide indications of the actual distance to the earth's surface instantly beneath the craft. It may be, for example, a system of the type described in United States Patent 2,045,072, issued June 23, 1936, to L. Espenschied. With indications of direction and distance from a known reference station and altitude above the earth's surface it is obvious that an aircraft pilot may guide his craft so as to follow any desired course in approaching or departing from the vicinity of the reference station.

Figure 5:
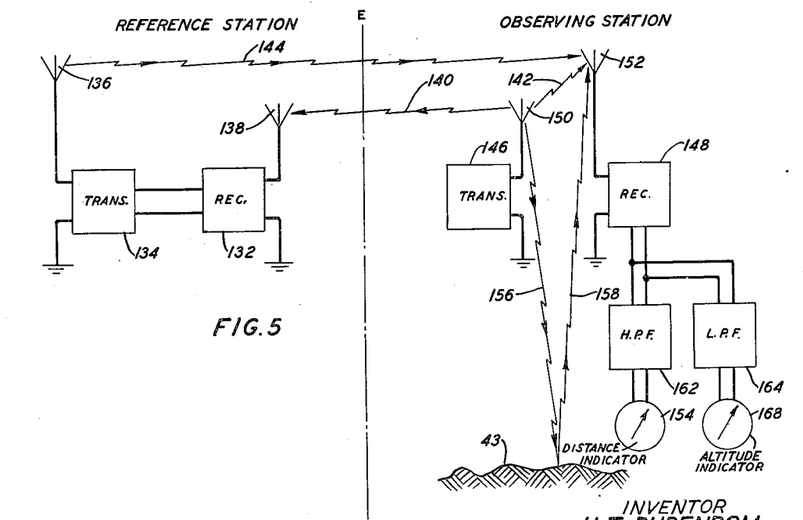
Fig. 5 shows, in diagrammatic form, a system employing a frequency-modulated wave to obtain simultaneously distance and altitude indications.

In Fig. 5 an alternative method and system for obtaining distance indications is illustrated in diagrammatic form. This method and system may be employed to supplement the phase comparison method and system described above and may, in particular, be employed to greatly extend the range over which precise distance indications may be obtained.

In Fig. 5 a transmitter 146 is located at the observing station, i. e., upon a mobile craft. Transmitter 146 energizes antenna 150 with a frequency modulated wave such, for example, as is employed in the altimeter of United States Patent 2,045,072 to Espenschied mentioned above. The wave is radiated and a component 140 is received at the reference station on antenna 138, amplified in receiver 132 and retransmitted by transmitter 134 from antenna 136 via component 144 to antenna 152 at the observing station. Antenna 152 is also arranged so as to receive a relatively small amount of energy, i. e., component 142, directly from antenna 150. Components 142 and 144 are combined and detected in receiver 148 and the resulting beat-note frequency is caused to actuate a frequency indicator 154 which may be calibrated to read distance directly. The system is obviously analogous to the altimeter of Espenschied's above-noted patent, except that a relay or reference station located at a point of known location is employed to "reflect" the wave back to the observing station in the place of obtaining reflection from a passive reflecting surface. Obviously, in order to reduce difficulties at the reference station from "singing" or regeneration, etc., a carrier of fixed frequency, modulated by a frequency-modulated wave can be employed in place of a simple frequency-modulated carrier and the retransmission from the reference station may be, by means of a different carrier, modulated by the frequency-modulated wave derived by detecting the modulated carrier received in receiver 132. Also, where the observing system of Fig. 5 is on an aircraft part of the frequency-modulated wave may be directed toward the earth beneath and reflections thereof received from the earth and combined with the instantly radiated wave to obtain a beat-note, the frequency of which is indicative of the altitude of the craft as taught by Espenschied, supra. In general, the distance to the reference station will be very much greater than the altitude and the beat frequency indicative of distance thereto will therefore be much higher than that indicating altitude so that appropriate filters may be employed to separate the two beat frequencies whereby the output of one may actuate a meter showing altitude and the output of the other filter may actuate a distance indicator.

Figure 6:
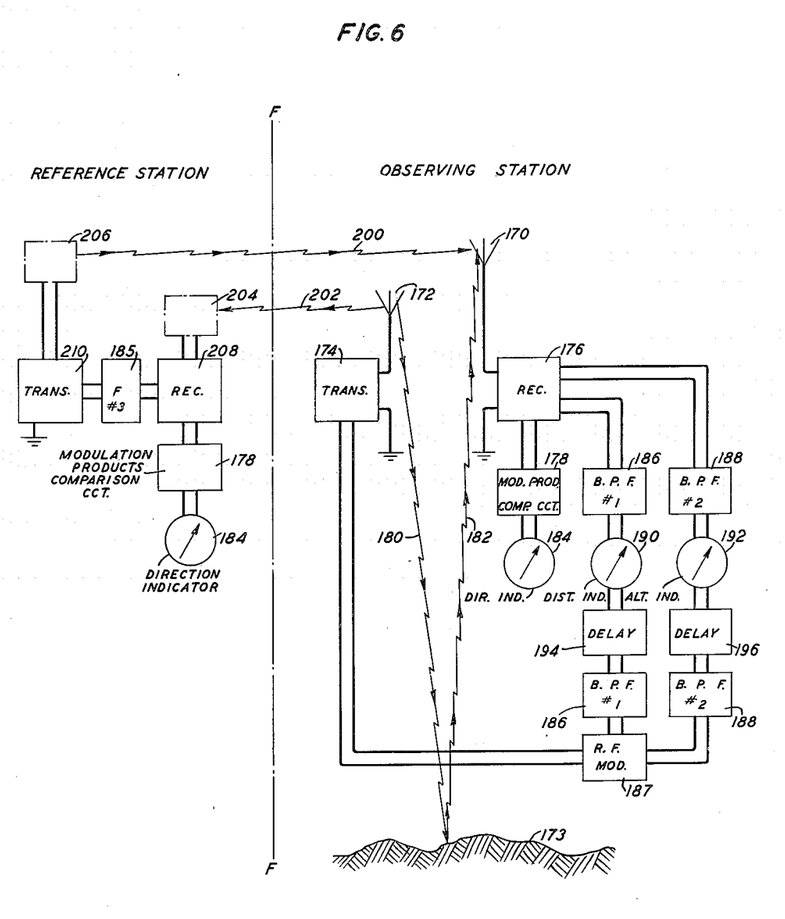
Fig. 6 shows in diagrammatic form a system of the invention employing an ultra-short wave modulated by two different radio frequency waves of longer wave-lengths, the system being arranged to provide simultaneous indications of altitude, distance and direction.

In Fig. 6 a further alternative system of the invention is shown diagrammatically which will provide on an aircraft simultaneous and instantaneous indications of distance, altitude and direction. At the observing station transmitter 174 transmits from antenna 172 a radio wave, preferably of ultra-high frequency, which is modulated by two lower radio frequencies provided by modulator 187. The first of these lower radio frequencies has a period slightly greater than that required for a signal to travel twice the longest distance to be measured and the second has a period slight greater than that required for a signal to travel twice the greatest altitude to be measured. Band-pass filter 186 will pass the first said frequency but exclude the second and band-pass filter 188 will pass the second and exclude the first.

To measure altitude, some of the energy radiated by antenna 172 represented by wave 180, is directed toward the ground 173 under the mobile craft and is received after reflection, as wave 182, therefrom by antenna 170. The wave 182 is detected in receiver 176 and the second radio frequency above mentioned is selected by filter 188 connected to the receiver output and compared in phase meter 192 with energy of like frequency derived from radio frequency modulator 187 through the filter 188 connected to said modulator. Delay network 196 is adjustable to compensate for time delay in the apparatus of the observing station. Meter 192 can be calibrated to read altitude directly.

Another portion of the energy radiated by antenna 172 represented by wave 202 reaches antenna system 204 at the reference station. Antenna system 204 is preferably of the type illustrated by array 31 of Fig. 3. In receiver 208 the radio frequency modulation of the longer period as described above is detected and selected by filter 185 for transmitter 210 where it is caused to modulate a wave 200 radiated from antenna 206 to receiving antenna 170 at the observing station. Wave 200 is also preferably an ultra-high frequency wave but of sufficiently different frequency from wave 202 that it may be readily separated therefrom in receiver 176. The radio frequency modulation is detected in receiver 176, preferably in an independent channel thereof, and passed through band-pass filter 186 to phase indicator 190 where its phase is compared with the original modulating current of like frequency derived from radio frequency modulator 187 through a second filter 186. Delay network 194 is adjusted to compensate for the combined delay of the observing station and reference station apparatus with respect to the modulating frequency used. Receiver 208 also functions to produce two voice frequency poling frequencies to which are imparted directional characteristics and which are employed in modulation products comparison circuit 178 and direction indicator 184 at the reference station to provide an indication of the direction from which wave 202 approached antenna system 204. The operation of such apparatus has been described in detail in connection with Fig. 3 above.

As is also described in connection with Fig. 3 the modified voice frequency poling frequencies, together with a base frequency from which the latter may be derived, are furnished the transmitter 210 of the reference station and employed to modulate wave 200. Filter 185 should therefore obviously pass the poling frequencies and base frequency as well as the above-mentioned radio frequency modulation frequency. It may be a low- and band-pass type of filter or a simple low-pass filter cutting off above the lower radio modulation frequency and below the upper radio modulation frequency originally borne on wave 202. At the observing station, receiver 176 will detect and furnish modulation products comparison circuit 178 and direction indicator 184 with the modified poling frequencies and the base frequency and a direction indication is obtained as described in connection with the system of Fig. 3. Thus there is furnished at the observing station simultaneous indications of direction, distance and altitude.

Obviously, distance indications with respect to a plurality of reference stations could be obtained simultaneously by modulating wave 202 by additional radio frequency waves of suitable different periods. At the plurality of reference stations apparatus identical with that indicated in Fig. 6 to the left of line F—F can be employed except that filter 185 would for each additional reference station be replaced by a filter passing only a particular one of the radio modulating frequencies and excluding the others, each station retransmitting a different radio modulating frequency back to antenna 170. For such a system additional circuits such as that comprising band-pass filters 186, delay network 194 and distance indicator 190 would be required at the observing station for each additional indication, the filters for each circuit being designed to pass the particular radio modulating frequency associated with the reference station from which a distance indication is to be obtained.

Alternatively a single low modulating radio frequency can be impressed upon the high frequency radio wave radiated from said craft and the receiver 176 can be tuned consecutively to receive reflections from the earth and transmitted waves of several different high radio frequencies from a like number of different reference stations, each of the latter several radio frequencies being modulated by the single low modulating radio frequency obtained by receiving at each reference station the modulated wave radiated from the craft and detecting the low modulating radio frequency and employing it to modulate the high radio frequency wave radiated from that reference station. Again by making radio receiver 176 on said craft a multichannel receiver having a channel tuned to each source from which waves are to be received, simultaneous indications can be obtained with an arrangement of apparatus essentially the same as that shown to the right of line F—F of Fig. 6. By correlating distance indications from several reference stations, the location of the craft can be determined independently of other means of direction and position determination and a check on the accuracy of the apparatus on the craft can thus be obtained. The above-described arrangements illustrate the extreme flexibility and broad scope of the principles of applicant's invention. Numerous other arrangements of a similar nature will occur to those skilled in the art.

Figure 7:
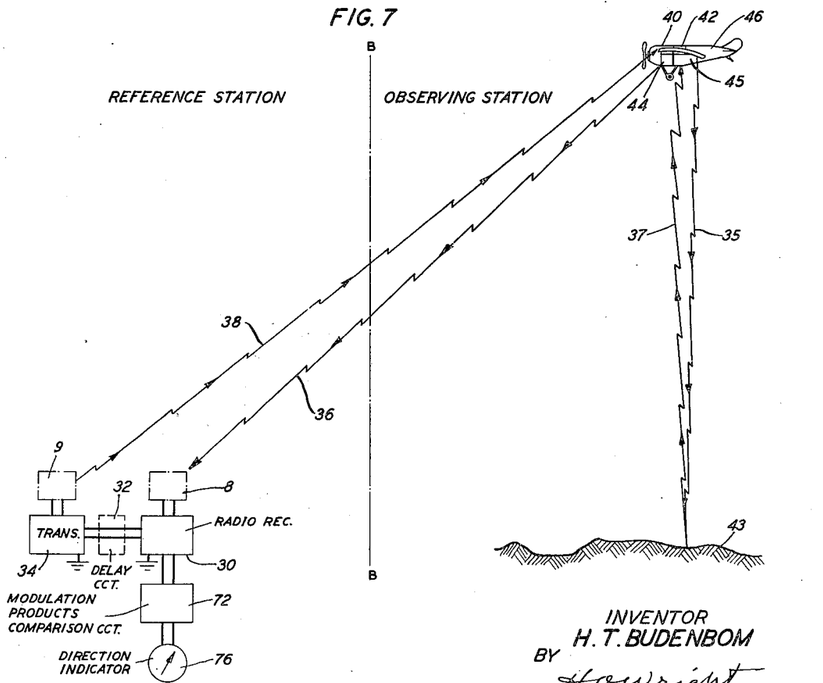
Fig. 7 illustrates, in diagrammatic form, a system of the invention for providing directional, distance, altitude and position indications to an aircraft in flight.

In Fig. 7 is shown an aircraft 46 on which the observing station is located. The aircraft carries an altimeter system 45, preferably of the type employing a frequency-modulated wave exemplified by the above-mentioned patents to Espenschied, in which the beat-note between transmitted wave 35 and reflected wave 37 has a frequency indicative of the altitude.

Aircraft 46 also carries a transmitter 44 and a receiving system 40 as well as a modulation products comparison circuit 42 which includes an indicator oriented to point at the reference station, as described above.

The reference station may be essentially that shown in connection with Fig. 3 above, antenna system 8 being equivalent to system 31, receiver 30 being equivalent to receiver 62, transmitter 34 being equivalent to transmitter 66 and antenna system 9 being equivalent to antenna 68, respectively, the same comparison circuit 72 and indicator 76 being employed by the reference stations of the two figures. Delay circuit 32 is, however, peculiar to Fig. 7 and permits the transmission of wave 38 to be delayed so that it may be received on aircraft 46 after the latter has ceased transmitting so that the directional indication will not be obscured by interference from the transmitter on the craft.

Alternatively antenna system 9 may be equivalent to system 86 of Fig. 4 and transmitter 34 may be arranged to directionally transmit several different side-bands in addition to a carrier frequency, as for the system of Fig. 4 so that aircraft suitably equipped may obtain directional indications without themselves transmitting, and this in addition to modulating the carrier emitted by transmitter 34 with the poling frequencies provided by receiver 30 and modified by the components of wave 36 (in the event the aircraft does transmit) as received by receiving antenna system 8. These latter poling frequencies should, of course, differ substantially from frequencies employed in developing the side-bands for directional transmission as above described so that an aircraft pilot may select by suitable band filters the desired set of frequencies from which he desires to obtain a directional indication. Obviously, too, waves 36 and 38 could be frequency modulated to provide distance indications as described in connection with Fig. 5.

The above-described arrangements are merely illustrative of a very large variety of combinations of apparatus which may readily be made, as embodiments of the principles of the invention, which will occur to those skilled in the art. No attempt has here been made to exhaustively cover such applications. The scope of the invention is defined in the following claims.

What is claimed is:

1. The method of determining the distance between two points which comprises radiating from one of said points an electromagnetic wave the wave-length of which exceeds the maximum distance to be measured, separately receiving at the other of said points the magnetic and the electric components of the wave, respectively, emanating from said first point and determining the time-phase relation between the separately received components to obtain an indication of the distance between said points.

2. A system for indicating distance from a predetermined point comprising means for radiating from said point an electromagnetic wave of wave-length exceeding the greatest distance to be indicated, means for separately receiving the magnetic and electric components of said wave, respectively, and means for determining the time-phase relation between the separately received components.

3. A radio directional indicating system for mobile craft comprising means for transmitting a radio signal from said craft, means located at a known fixed point for directionally receiving a plurality of components of said signal and imparting the phase and amplitude characteristics of each directionally received component to a different low poling frequency, means for detecting said modified low poling frequencies, means for transmitting to said craft from said fixed point a radio carrier wave modulated by the said different modified low poling frequencies and a base frequency from which unmodified low poling frequencies of like frequencies may be derived, means for receiving said radio carrier wave on said craft and detecting said modified poling frequencies and said base frequency, means on said craft for deriving unmodified poling frequencies of like frequencies to the modified poling frequencies from said base frequency and means on said craft actuated by the combination of said detected modified poling frequencies and said derived unmodified frequencies of like frequencies for indicating the direction with respect to said fixed point of the radio signal transmitted from said craft.

4. In a radio directional indicating system for mobile craft, means for transmitting a radio signal from said craft, means at a known fixed point for directionally receiving a plurality of components of said signal and imparting the phase and amplitude characteristics of said plurality of components to a like plurality of different low poling frequencies, respectively, means at said fixed point for transmitting to said craft a radio wave modulated by said plurality of different poling frequencies to which the said particular characteristics have been respectively imparted, means on said craft for receiving said radio wave and detecting and separating said plurality of different low poling frequencies, and means on said craft for comparing the phase and amplitude characteristics of said different low poling frequencies to obtain a directional indication with respect to said fixed point.

5. In a radio directional system for determining the direction of a transmitted radio signal, means for directionally receiving a plurality of components of said signal at a known fixed point and imparting the phase and amplitude characteristics of each of said components to a like plurality of different low poling frequencies, respectively, means for detecting said modified poling frequencies, and means at said fixed point for transmitting a radio wave modulated by said plurality of different low poling frequencies to which the said particular characteristics have been respectively imparted, and means at a second receiving station for receiving said modulated carrier wave, detecting and separating said different low poling frequencies and comparing their phase and amplitude characteristics to obtain an indication of the direction of approach of the first said radio signal with respect to the said fixed point.

6. A radio direction and distance indicating system including at a first point means for directionally receiving a plurality of components of a radio wave comprising a like plurality of differently oriented directional antennas, means for imparting the phase and amplitude characteristics of said components to a like plurality of different low frequency currents, respectively, means for detecting said different low frequency currents, means also at said first point for transmitting a radio wave of wave-length exceeding the maximum distance to be indicated, means for modulating said second-mentioned wave with the detected modified low frequency currents and with a base frequency from which said low frequency currents can be derived; and at a second point means for severally receiving the radiation and magnetic components of the second-mentioned wave, means for determining the time-phase relation between said components to obtain an indication of the distance from said first point, means for detecting the modified low frequency currents and the base frequency, and means for deriving therefrom an indication of the direction in which the first-mentioned wave approached the said first point.

7. In a radio distance and direction indicating system, means at a fixed point for radiating a radio wave having a wave-length exceeding the maximum distance to be indicated, means for modulating said wave with a plurality of different low frequencies, one of said low frequencies being a base frequency from which the other low frequencies may be derived, means for severally selecting the side-bands resulting from the modulation of said wave by said other low frequencies, means for severally and directionally radiating the selected side-bands, the directive radiation pattern for each pair of side-bands being oriented in a particular different direction, means at a second point for separately receiving the magnetic and electric components of said wave and determining their time-phase relation, means for receiving said directionally radiated side-bands and detecting the different low frequencies and means for comparing the relative phase and amplitude characteristics of said different low frequencies.

8. In a navigational system, means for radiating from a known reference point an electromagnetic wave of wave-length exceeding the greatest distance to be determined, means at an observing station for separately receiving the magnetic and the electric components of said wave and means for determining the time-phase relation between the said received magnetic component and the said received electric component whereby an indication of the distance between said reference point and said observing station is obtained.

HORACE T. BUDENBOM.